US012181254B2

(12) United States Patent
Mechinus et al.

(10) Patent No.: US 12,181,254 B2
(45) Date of Patent: Dec. 31, 2024

(54) ACTIVE SHOOTER MONITORING AND INCAPACITATION SYSTEM

(71) Applicant: The United States of America, as represented by the Secretary of the Navy, Crane, IN (US)

(72) Inventors: Jesse R. Mechinus, Bloomington, IN (US); Gerald Miller, Bloomington, IN (US); James L Stewart, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 383 days.

(21) Appl. No.: 17/729,543

(22) Filed: Apr. 26, 2022

(65) Prior Publication Data

US 2022/0341713 A1  Oct. 27, 2022

Related U.S. Application Data

(60) Provisional application No. 63/179,727, filed on Apr. 26, 2021.

(51) Int. Cl.
| | |
|---|---|
| *F41H 11/00* | (2006.01) |
| *F41H 13/00* | (2006.01) |
| *F42B 12/54* | (2006.01) |
| *G08B 15/00* | (2006.01) |
| *G08B 21/02* | (2006.01) |
| *H04N 7/18* | (2006.01) |

(Continued)

(52) U.S. Cl.
CPC ........ *F41H 11/00* (2013.01); *F41H 13/0012* (2013.01); *F41H 13/0087* (2013.01); *G08B 15/00* (2013.01); *G08B 21/02* (2013.01); *H04N 7/181* (2013.01); *H04N 23/66* (2023.01); *H04N 23/695* (2023.01); *F41H 13/0056* (2013.01); *F42B 12/54* (2013.01)

(58) Field of Classification Search
CPC ...................................................... F41H 11/00
See application file for complete search history.

(56) References Cited

U.S. PATENT DOCUMENTS

| | | | |
|---|---|---|---|
| 6,269,726 B1 * | 8/2001 | McNulty, Sr. ...... | F41H 13/0025 361/232 |
| 11,747,480 B2 * | 9/2023 | Goldstein ............... | G01S 17/04 356/5.01 |

(Continued)

*Primary Examiner* — Joseph H Feild
*Assistant Examiner* — Pameshanand Mahase
(74) *Attorney, Agent, or Firm* — Naval Surface Warfare Center, Crane Division; Christopher Feigenbutz

(57) ABSTRACT

Provided is a an active shooter monitoring and incapacitation system that can augment active security forces control during emergencies at schools, churches, military, and government institutions. The system includes one or more cameras that are controlled remotely by an operator. If a hostile person or active shooter is located, a warning system, such as an audio/visual alert and laser dazzler is activated to alert nearby people of the threat to vacate and to notify the active shooter that he/she is required to halt any hostile actions. If the hostile person does not cease his activities, one or more stun guns contained within the system are then utilized to incapacitate the active shooter with a large electric shock, thereby incapacitating the person until the authorities arrive.

3 Claims, 4 Drawing Sheets

(51) Int. Cl.
  *H04N 23/50*    (2023.01)
  *H04N 23/66*    (2023.01)
  *H04N 23/695*   (2023.01)
  *H04N 23/90*    (2023.01)

(56) References Cited

U.S. PATENT DOCUMENTS

| | | | |
|---|---|---|---|
| 12,018,918 B2* | 6/2024 | Batchelder | F41H 13/0025 |
| 2014/0334058 A1* | 11/2014 | Galvan | F41G 1/35 |
| | | | 361/232 |
| 2020/0074825 A1* | 3/2020 | Martin | G05B 15/02 |
| 2020/0221002 A1* | 7/2020 | Akana | H04N 23/57 |
| 2022/0148397 A1* | 5/2022 | Schoeman | H04L 12/2823 |

* cited by examiner

ACTIVE SHOOTER MONITORING AND INCAPACITATION SYSTEM

CROSS-REFERENCE TO RELATED APPLICATIONS

The present application claims priority to U.S. Provisional Patent Application Ser. No. 63/179,727, filed Apr. 26, 2021, entitled "ACTIVE SHOOTER MONITORING AND INCAPACITATION SYSTEM," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200575US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to monitoring systems. More particularly, it pertains to an active shooter monitoring and incapacitation system that can augment active security forces control during emergencies at schools, churches, military, and government institutions.

BACKGROUND

According to the Department of Homeland Security, an active shooter is an individual actively engaged in killing or attempting to kill people in a confined and populated area. In most cases, active shooters use firearms and have no pattern or method to their selection of victims. Most incidents occur at locations in which the active shooters find little impediment in committing their attack. Such locations are generally described as soft targets, as they carry limited security measures to protect members of the public. Active shooter situations are unpredictable and evolve quickly. Typically, the immediate deployment of law enforcement is required to stop the shooting and mitigate harm to victims. Active shooter situations are often over within 10 to 15 minutes, which is often before law enforcement can arrive on the scene.

SUMMARY OF THE INVENTION

The present invention relates to an active shooter monitoring and incapacitation system that can augment active security forces control during emergencies at schools, churches, military, and government institutions. The system includes one or more cameras that are controlled remotely by an operator. If a hostile person or active shooter is located, a warning system, such as a speaker and visual warning signal is activated to alert nearby people of the threat to vacate and to notify the active shooter that he/she is required to halt any hostile actions. If the hostile person does not cease his activities, one or more stun guns contained within the system are then utilized to incapacitate the active shooter with a large electric shock, thereby incapacitating the person until the authorities arrive.

According to an illustrative embodiment of the present disclosure, it is an object of the invention to provide an active shooter monitoring and incapacitation system that can augment active security forces control during emergencies at schools, churches, military, and government institutions.

According to a further illustrative embodiment of the present disclosure, it is an object of the invention to provide an active shooter monitoring and incapacitation system that utilizes a speaker and visual light warning to alert nearby people of the threat to vacate and to notify the active shooter that he/she is required to halt any hostile actions.

According to a yet another illustrative embodiment of the present disclosure, it is an object of the invention to provide an active shooter monitoring and incapacitation system that provides one or more stun guns contained within the system are then utilized to incapacitate the active shooter with a large electric shock, thereby incapacitating the person until the authorities arrive.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, disclosed is a public safety monitoring and incapacitation apparatus comprising a rotating base, a surface mount, and a retractable privacy dome. Included within the dome are one or more cameras, an audio/visual alert system, and one or more non-lethal electroshock weapons. Circuitry within the apparatus is configured to communicate with a remote central station, wherein a user can control the cameras, audio/visual alert system, retractable privacy dome, and the one or more non-lethal electroshock weapons.

Figure 1:
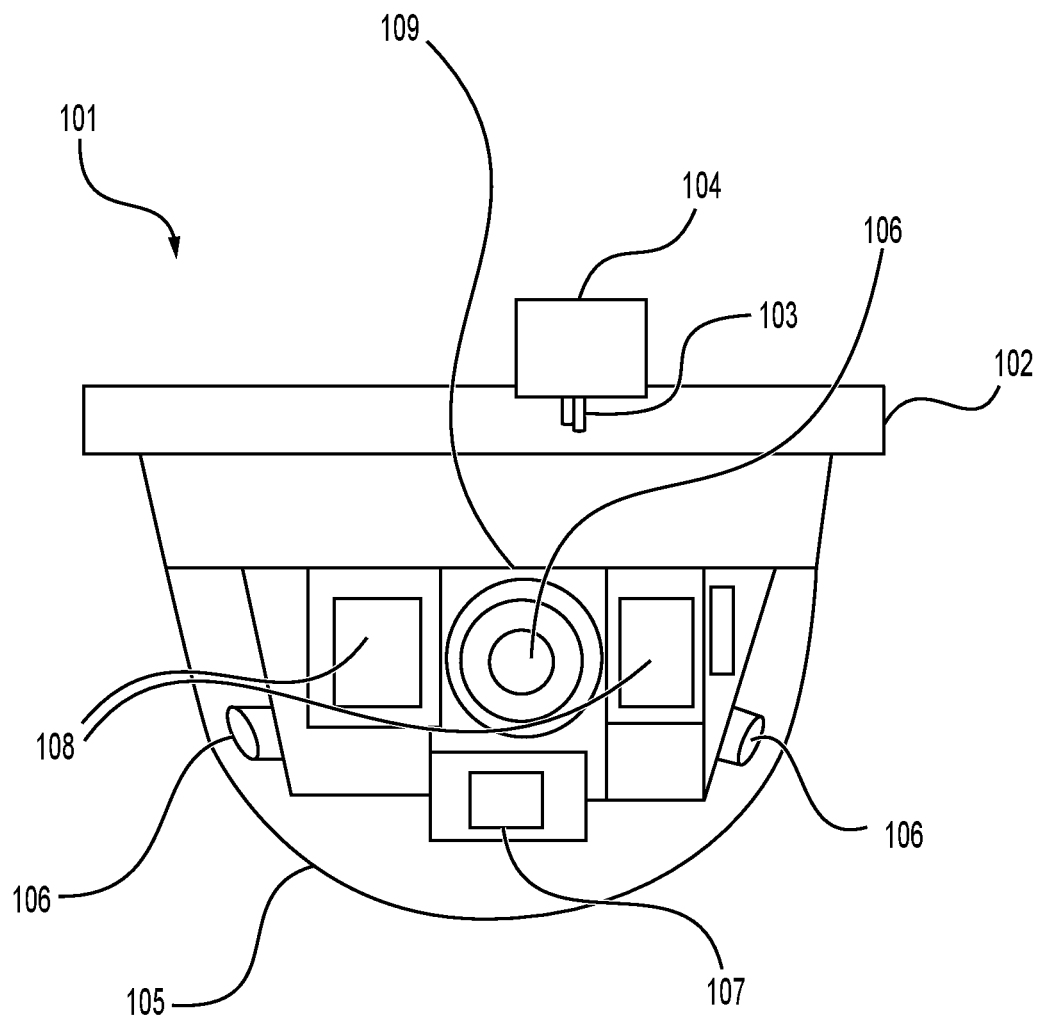
FIG. 1 shows a front view of the public safety monitoring and incapacitation apparatus.

FIG. 1 shows a front view of the public safety monitoring and incapacitation apparatus 101. The apparatus includes a rotating base 102 comprising a drive shaft 103, a servo motor controller 104, a surface mount, and a retractable privacy dome 105. Contained within the privacy dome 105 are one or more cameras 106. In the preferred embodiment, the apparatus 101 includes three cameras 106 spaced apart at 270 degrees. An audio/visual alert system 107 is attached to the rotating base 102 and positioned behind the retractable privacy dome 105. Also included are one or more non-lethal electroshock weapons 108 (preferably stun guns) to the rotating base 102 and positioned behind the retractable privacy dome 105. Circuitry 109, is provided to communicate with a control center, which will be discussed in greater detail below.

Figure 2:
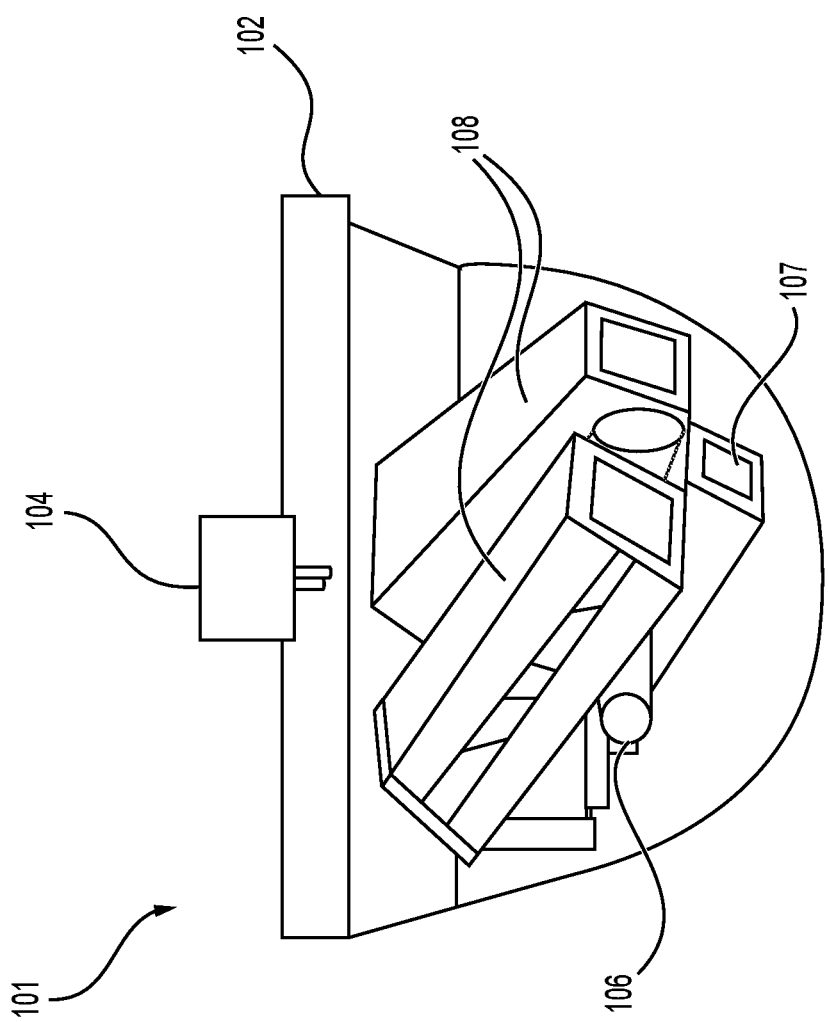
FIG. 2 shows a side view of the public safety monitoring and incapacitation apparatus.

FIG. 2 shows a side view of the public safety monitoring and incapacitation apparatus 101. The aiming of the systems effectors utilizes a servo motor controller 104 and synchro's tied to chain drives capable of snap movement and activation. The operator will have full control and dexterous aiming capability to aim and shoot at a moment's notice. The system can rotate 360 degrees to track shooter(s) via cameras 106 mounted each way, which allows security to monitor all directions and swivel the apparatus via the rotating base 102. An audio/visual alert system 107 comprising a laser will be able to dazzle the active shooter with a bright light. If this does not work the next step would be incapacitation by the non-lethal electroshock weapons 108. Alternately, tranquilizer darts can be utilized for nonhuman applications.

The active shooter will be warned through loud speaker with a recorded message to lie down on the floor and await police authorities. The audio/visual alert system 107 will be able to alert the active shooter with a bright light. If this does not work the next step would be incapacitation by the non-lethal electroshock weapons 108 if the active shooter does not comply. One non-lethal electroshock weapon 108 will be fired by the control room operator if the active shooter does not comply. A second non-lethal electroshock weapon 108 can be used if first shot fails or a second active shooters is present.

Figure 3:
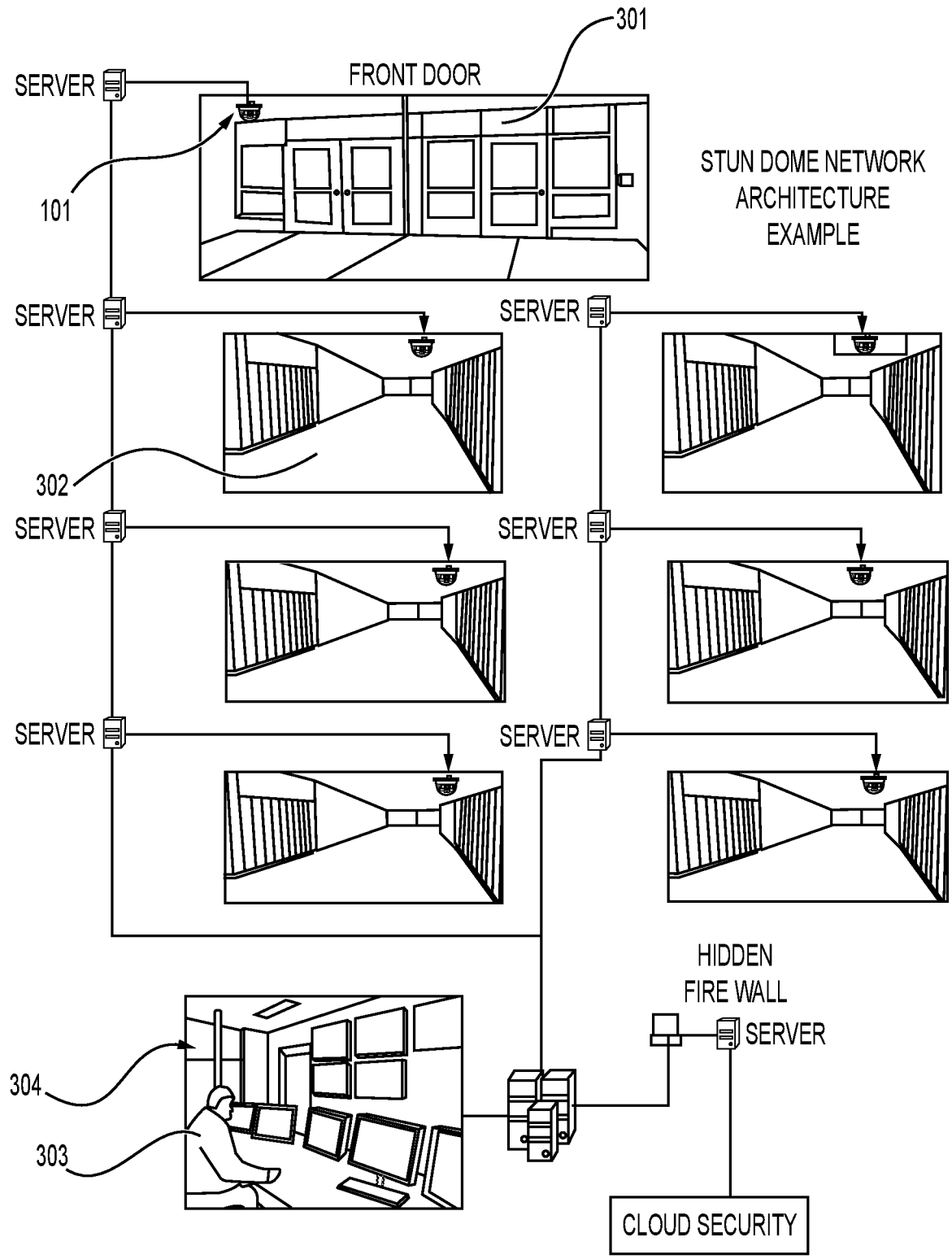
FIG. 3 shows a circuitry configured to communicate with a remote central station.

FIG. 3 shows a circuitry configured to communicate with a remote central station. A user accessing the remote central station can control one or more cameras, audio/visual alert system, retractable privacy dome, and one or more non-lethal electroshock weapons. The incapacitation apparatus 101 can be mounted outside a front door 301, in one or more hallways 302, or any other desired location.

The system preferably operates 24/7 with a manned operator 303 that operates the controls from a control room 304. A warning will alert authorities to the hostile active shooter and the incapacitation apparatus 101 is brought online. As best viewed in FIGS. 1-2, the retractable privacy dome 105 will retract or fall off completely to expose the audio/visual alert system 107 that includes the laser to dazzle intruder, loud speaker, three cameras 106 spaced apart at 270 degrees and non-lethal electroshock weapons 108. The apparatus 101 rotates 360 degrees via the a rotating base 102 comprising a drive shaft 103, a servo motor controller 104 to track shooter(s) cameras mounted each way will allow security to monitor all directions and swivel stun apparatus to target.

Figure 4:
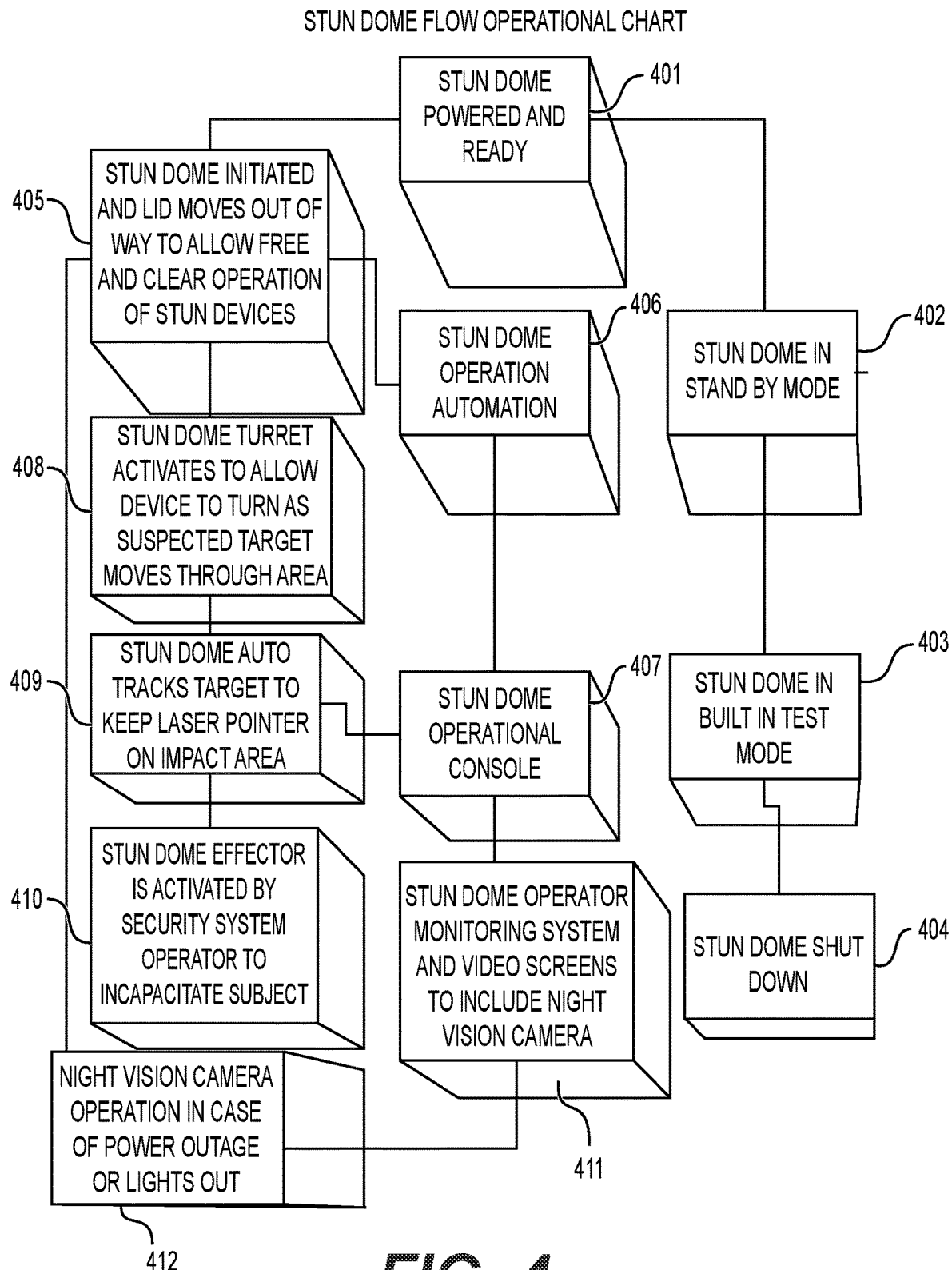
FIG. 4 shows an operational flowchart of the incapacitation apparatus.

FIG. 4 shows an operational flowchart of the incapacitation apparatus. At 401, the system is powered. At 402, the system is in standby mode, and can operate a built in test mode 403 or can be shut down 404. At 405, the device is initiated and the lid moves out of the way. The system can operate via automation operation 406, which activates the operational console 407. The rotating base is activated at 408 to allow the device to turn as the target moves through an area. At 409, the device auto tracks the target to keep the laser dazzler pointer on the impact area. At 410, the effector is activated by the security system operator to incapacitate the subject. From the operational console, the system can include night vision camera at 411, which can be activated at 412 in case of power outage or lights out.

Although the invention has been described in detail with reference to certain preferred embodiments, variations and modifications exist within the spirit and scope of the invention as described and defined in the following claims.

The invention claimed is:

1. A public safety monitoring and incapacitation apparatus comprising:
   a rotating base comprising a drive shaft, a servo motor controller, a surface mount, and a retractable privacy dome;
   a first, second, and third camera spaced apart at 270 degrees and contained within said retractable privacy dome;
   an audio/visual alert and dazzle system comprising a laser dazzler contained within said retractable privacy dome;
   one or more non-lethal electroshock weapons contained within said retractable privacy dome;
   one or more tranquilizer dart launchers contained within said retractable privacy dome;
   a loud speaker with a prerecorded message; and
   circuitry configured to communicate with a remote central station, wherein a user accessing said remote central station can control said cameras, said audio/visual alert system, said retractable privacy dome, said one or more non-lethal electroshock weapons, and said one or more tranquilizer dart launchers.

2. A public safety monitoring and incapacitation apparatus comprising:
   a rotating base comprising a drive shaft, a servo motor controller, a surface mount, and a retractable privacy dome;
   one or more cameras attached to said rotating base and positioned behind said retractable privacy dome;
   an audio/visual alert and dazzle system attached to said base and positioned behind said retractable privacy dome;
   one or more non-lethal electroshock weapons attached to said base and positioned behind said retractable privacy dome; and
   circuitry configured to communicate with a remote central station, wherein a user accessing said remote central station can control said one or more cameras, said audio/visual alert system, said retractable privacy dome, and said one or more non-lethal electroshock weapons.

3. A public safety monitoring and incapacitation apparatus comprising:
   a rotating base and a retractable privacy dome;
   one or more cameras contained within said retractable privacy dome;
   an audio/visual alert and dazzle system contained within said retractable privacy dome;
   one or more non-lethal weapons contained within said retractable privacy dome;
   a loud speaker; and
   circuitry configured to communicate with a remote central station, wherein a user accessing said remote central station can control said one or more cameras, said audio/visual alert and dazzle system, said retractable privacy dome, and said one or more non-lethal weapons.

* * * * *